(12) United States Patent
Weidner et al.

(10) Patent No.: US 6,541,548 B2
(45) Date of Patent: Apr. 1, 2003

(54) FLAME RETARDANT AROMATIC POLYCARBONATE RESIN COMPOSITION

(75) Inventors: Richard Weidner, Burghausen (DE); Hiroji Oda, Okayama (JP)

(73) Assignees: Wacker-Chemie GmbH, Munich (DE); Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/921,417

(22) Filed: Aug. 2, 2001

(65) Prior Publication Data

US 2002/0037966 A1 Mar. 28, 2002

(30) Foreign Application Priority Data

Aug. 7, 2000 (JP) .......................... 2000-238577

(51) Int. Cl.⁷ .......................... C08L 69/00; C08L 83/04; C08K 5/549
(52) U.S. Cl. .......................... 524/108; 524/267; 524/268; 524/269; 525/101; 525/464; 525/67
(58) Field of Search .............................. 525/101, 464, 525/67; 524/267, 268, 269, 108

(56) References Cited

U.S. PATENT DOCUMENTS

| | | | |
|---|---|---|---|
| 4,273,691 A | | 6/1981 | MacLaury et al. |
| 4,305,856 A | * | 12/1981 | Sakano |
| 5,010,148 A | | 4/1991 | Lewis |
| 6,001,921 A | * | 12/1999 | Serizawa |
| 6,353,046 B1 | * | 3/2002 | Rosenquist |

FOREIGN PATENT DOCUMENTS

| | | | |
|---|---|---|---|
| JP | 56100853 | | 8/1981 |
| JP | 59500099 | | 1/1984 |
| JP | 61241344 | | 10/1986 |
| JP | 3143951 | | 6/1991 |
| JP | 6306265 | | 11/1994 |
| JP | 6336547 | | 12/1994 |
| JP | 10139964 | | 5/1998 |
| JP | 11140294 | | 5/1999 |
| JP | 11217494 | | 8/1999 |
| JP | 11222559 | | 8/1999 |
| WO | 00/46299 | * | 8/2000 |

OTHER PUBLICATIONS

Patent Abstract of Japan Corresponding To JP 6–306265.
Patent Abstract of Japan Corresponding To JP 6–336547.
Patent Abstract of Japan Corresponding To JP 11–222559.
Patent Abstract of Japan Corresponding To JP 10–139964.
Patent Abstract of Japan Corresponding To JP 11–217494.
Patent Abstract of Japan Corresponding To JP 11–140294.
English Derwent Abstract AN 1983–61243K Corresponding To JP 59–500099.
English Derwent Abstract AN 1981–33726D Corresponding To JP 56–100853.

* cited by examiner

*Primary Examiner*—David J. Buttner
(74) *Attorney, Agent, or Firm*—Brooks & Kushman P.C.

(57) ABSTRACT

There is provided an aromatic polycarbonate resin composition which exhibits high flame retardancy without sacrificing melt-molding stability or melt fluidity when molding the resin composition. The flame retardant aromatic polycarbonate resin composition comprises a resin component (a) comprising an aromatic polycarbonate and optionally a styrene polymer, the resin composition having an aromatic polycarbonate content of 20% by weight or more; and 0.1 to 50 parts by weight of an organopolysiloxane (b) comprising a linear organopolysiloxane (b)i and a cyclic organopolysiloxane (b)ii, component (b)ii present in an amount of from 5 to 95% by weight based on the total weight of components (b)i and (b)ii.

5 Claims, No Drawings

FLAME RETARDANT AROMATIC POLYCARBONATE RESIN COMPOSITION

BACKGROUND OF THE INVENTION

1. Field of the Invention

The present invention relates to a flame retardant aromatic polycarbonate resin composition. More particularly, the present invention is concerned with an aromatic polycarbonate resin composition imparted with flame retardancy by an organopolysiloxane having a specific structure.

2. Background Art

Aromatic polycarbonates are known engineering plastics which have excellent impact resistance, heat resistance and transparency, and have been widely used in various fields, especially in the fields of office automation machines, household electric appliances and data communication equipment. In these fields, there has been a demand for mechanical parts having a thin section as well as a complicated structure. To meet these demands, the melt fluidity of aromatic polycarbonates has been increased to achieve high injection moldability by adding a styrene resin to the polycarbonate. A rubber-modified styrene resin is generally used for this purpose to achieve desired properties such as impact resistance of the resultant aromatic polycarbonate resin composition.

An aromatic polycarbonate has a limiting oxygen index (which is a criterion for the flame retardancy) of from 26 to 27, and is known as a resin having a self-extinguishing property. However, in many electric/electronic devices, a higher level of flame retardancy is strictly required to assure the high safety of products.

As a technique for imparting a high level of flame retardancy to a resin, it is known to incorporate therein flame retardants, for example halogen-containing flame retardants, phosphorus-containing flame retardants, and auxiliary flame retardants such as antimony oxide. However, in recent years, due to the growing interest in the environment, attempts are being made to change the above-mentioned flame retardants to flame retardants having less environmental impact, for example organopolysiloxanes. The use of organopolysiloxanes as flame retardants is known in the art.

In general, an organopolysiloxane is a polymer comprising recurring units of at least one type of unit selected from the group consisting of the following formulae (1) to (4):

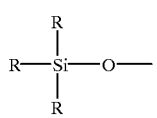

(1)

monofunctional structure (M structure);

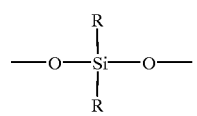

(2)

bifunctional structure (D structure);

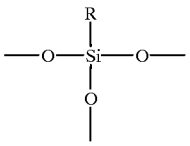

(3)

trifunctional structure (T structure)
(in formulae (1) to (3), R is a monovalent hydrocarbon group); and

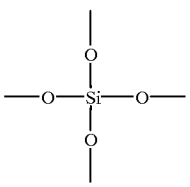

(4)

tetrafunctional structure (Q structure)
See the SILICONE HANDBOOK, edited by Kunio Ito and published by The Nikkan Kogyo Shimbun Ltd., Japan (1990)).

The effect of conventional organopolysiloxanes to impart flame retardancy to a resin is not totally satisfactory, however, and, therefore organopolysiloxanes have generally been used in combination with other flame retardants. For example, unexamined Japanese Laid-Open Patent Application Nos. 51-45160 and 56-100853, Japanese Published Application (Kohyo) No. 59-500099, and unexamined Japanese Laid-Open Patent Application Nos. 61-241344, 6-306265 and 6-336547 disclose the use of an organic alkali or alkaline earth metal salt in combination with an organopolysiloxane.

Further, unexamined Japanese Laid-Open Patent Application Nos. 3-143951, 10-139964, 11-140294, 11-217494 and 11-222559 each disclose a method of improving the flame retardancy of a resin by using an organopolysiloxane having an appropriately branched structure as a flame retardant.

An organopolysiloxane having a branched structure, hereinafter, simply referred to as a "branched organopolysiloxane" mainly comprises trifunctional (i.e., T structure, $RSiO_{3/2}$) and/or tetrafunctional structures (i.e., Q structure, $SiO_{4/2}$) of the four types of units mentioned above. However, the flame retarding effect of the branched organopolysiloxane is still unsatisfactory. The branched organopolysiloxane, in general, is resinous and has a high silicon atom content and, therefore, when such a branched organopolysiloxane is incorporated into a resin such as an aromatic polycarbonate, it lowers the fluidity of the resin.

Due to the branched structure, branched organopolysiloxanes have a high content of reactive terminal groups, such as silanol groups i.e., a hydroxyl group directly bonded to a silicon atom, or an alkoxysilyl group. For this reason, the organopolysiloxane per se is not only unstable at high temperatures, but also is likely to decompose the aromatic polycarbonate when kneaded therewith. The occurrence of these disadvantageous phenomena is markedly increased when a low molecular weight organopolysiloxane is used so as to improve kneadability with the aromatic polycarbonate. This is because the terminal group content of the organopolysiloxane molecules is increased due to the use of the low molecular weight organopolysiloxane molecules.

SUMMARY OF THE INVENTION

It is a primary object of the present invention to provide an aromatic polycarbonate resin composition which exhibits high flame retardancy without sacrificing the melt stability or the melt fluidity in molding the resin composition. The present inventors have made extensive studies with a view toward attaining the object of the present invention by using an organopolysiloxane comprising substantially bifunctional moieties (i.e., D structure, $R_2SiO_{1/2}$). As a result, it has unexpectedly been found that a resin composition may be prepared comprising an aromatic polycarbonate, and incorporated therein, organopolysiloxanes comprising in combination a linear organopolysiloxane comprised of recurring D units and a cyclic organopolysiloxane comprised of recurring D units. In such compositions, not only can the dispersibility of the organopolysiloxanes in the resin be improved, but also the resin composition exhibits excellent flame retardancy. In particular, the dripping of flaming particles is prevented when the resin composition burns. The present invention has been completed, based on this novel finding.

DETAILED DESCRIPTION OF THE PREFERRED EMBODIMENTS

According to the present invention, there are provided flame retardant aromatic polycarbonate resin compositions comprising 100 parts by weight of a resin component (a) containing an aromatic polycarbonate and optionally a styrene polymer, wherein the resin mixture has an aromatic polycarbonate content of 20% by weight or more, and 0.1 to 50 parts by weight of an organopolysiloxane (b) comprising at least one linear organopolysiloxane (b)i and at least one cyclic organopolysiloxane (b)ii wherein the organopolysiloxane (b) contains component (b)ii in an amount of from 5 to 95% by weight, based on the total weight of components (b)i and (b)ii, the at least one linear organopolysiloxane (b)i being represented by the following formula (5):

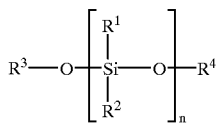

(5)

wherein:

n represents an integer of 2 or more;

each $R^1$ independently represents a monovalent $C_6$–$C_{20}$ hydrocarbon group containing an aromatic group;

each $R^2$ independently represents a monovalent $C_1$–$C_{20}$ hydrocarbon group containing no aromatic group; and each of $R^3$ and $R^4$ independently represents a hydrogen atom or a triorganosilyl group $SiR^5_3$, wherein each $R^5$ independently represents a monovalent $C_1$–$C_{20}$ hydrocarbon group; and the at least one cyclic organopolysiloxane (b)ii being represented by the following formula (6):

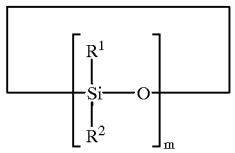

(6)

wherein m represents an integer of 3 or more; and $R^1$ and $R^2$ are as defined for formula (1) above.

The invention further provides further compositions according to those just described, wherein each $R^1$ in formulae (5) and (6) is a phenyl group and each $R^2$ in formulae (5) and (6) is a methyl group.

Resin component (a) used in the present invention comprises an aromatic polycarbonate optionally containing a styrene polymer.

In the present invention, the aromatic polycarbonate used as resin component (a) is an aromatic polycarbonate having a main chain comprising recurring units represented by the following formula (7):

(7)

(wherein Ar is the residue of a bifunctional phenolic compound). Such aromatic polycarbonates can be produced, for example, by a reaction between a bifunctional phenolic compound and a carbonate precursor; a reaction between a bifunctional phenolic compound and a carbonate monomer; or a polymerization reaction of a carbonate prepolymer.

For purposes of illustration, examples of methods for producing aromatic polycarbonates include an interfacial polymerization method, i.e., a phosgene method, in which a bifunctional phenolic compound is reacted with phosgene in the presence of an aqueous sodium hydroxide solution and methylene chloride as a solvent; a transesterification method i.e., a molten-state transesterification in which a bifunctional phenolic compound and diphenyl carbonate are subjected to transesterification; and a solid-phase polymerization method in which a crystallized carbonate prepolymer is used.

Examples of bifunctional phenolic compounds include 2,2-bis(4-hydroxyphenyl)propane (bisphenol A), 2,2-bis(4-hydroxy-3,5-dimethylphenyl)propane, 1,1-bis(4-hydroxyphenyl)ethane, bis(4-hydroxyphenyl)methane, 4,4'-dihydroxydiphenyl, 4,4'-dihydroxy-3, 3', 5,5'-tetramethyldiphenyl, 1,1-bis(4-hydroxyphenyl)cyclohexane, 1-phenyl-1,1-bis(4-hydroxyphenyl)ethane, bis(4-hydroxyphenyl)ether, bis(4-hydroxyphenyl)ketone, bis(4-hydroxyphenyl)sulfide, bis(4-hydroxyphenyl)sulfone, bis(4-hydroxyphenyl)sulfoxide, hydroquinone, resorcinol and catechol. 2,2-bis(4-hydroxyphenyl)propane (bisphenol A) is particularly preferred. In the present invention, these bi-functional phenolic compounds can be used individually or in combination.

It is preferred that the aromatic polycarbonate used in the present invention is an aromatic polycarbonate containing substantially no halogens in the structure thereof. From the viewpoint of mechanical strength and moldability, the viscosity average molecular weight of the aromatic polycarbonate is preferably in the range of from 10,000 to 100,000 Da (Daltons), more preferably in the range of from 14,000 to 40,000 Da. The viscosity average molecular weight of an aromatic polycarbonate can be determined from the solution viscosity of the aromatic polycarbonate using methylene chloride as a solvent.

In the present invention, the styrene polymer optionally contained in the resin mixture used as resin component (a) may be a rubber-modified styrene polymer and/or a non-rubber-modified styrene polymer. A rubber-modified styrene polymer alone, or a mixture of rubber-modified styrene polymer and non-rubber-modified styrene polymer are preferred.

A rubber-modified styrene polymer is a polymer having a structure in which a dispersion phase comprised of a particulate rubber polymer for modification is dispersed in a continuous phase comprised of a styrene polymer. A rubber-modified styrene polymer can be obtained by graft-polymerizing an aromatic vinyl monomer such as styrene, α-methylstyrene or p-methylstyrene and optionally other comonomers copolymerizable with the aromatic vinyl monomer, onto a rubber polymer. Customary methods such as bulk polymerization, emulsion polymerization, or suspension polymerization may be employed.

Examples of rubber polymers suitable for modification include diene rubbers such as polybutadiene, poly(styrene-butadiene) and poly(acrylonitrile-butadiene); isoprene rubbers; chloroprene rubbers; acrylic rubbers such as polybutyl acrylate; ethylene/propylene/diene terpolymers (EPDM); and ethylene/octene copolymer rubbers.

Examples of comonomers copolymerizable with the aromatic vinyl monomer include unsaturated nitrile monomers such as acrylonitrile and methacrylonitrile; and vinyl monomers such as acrylic acid, methacrylic acid, maleic anhydride and N-substituted maleimides.

In the present invention, the content of the rubber polymer employed in modifying the rubber-modified styrene polymer is preferably in the range of from 2 to 50% by weight, more preferably from 5 to 30% by weight. When the content of the rubber polymer in the rubber-modified styrene polymer is less than 2% by weight, the impact resistance of the rubber-modified styrene polymer is low, while when the content of the rubber polymer is more than 50% by weight, the rubber-modified polymer suffers not only a decrease in heat stability and stiffness, but also a lowering of melt fluidity and the occurrence of discoloration and gelation. The average diameter of the rubber polymer particles in the rubber-modified styrene polymer is preferably from 0.1 to 5.0 μm, more preferably from 0.2 to 3.0 μm.

Preferred examples of rubber-modified styrene polymers include so-called high impact polystyrene (hereinafter, frequently referred to as "HIPS"), acrylonitrile/butadiene/styrene copolymer (ABS resin), acrylonitrile/acrylic rubber/styrene copolymer (AAS resin), acrylonitrile/ethylene-propylene rubber/styrene copolymer (AES resin) and methyl methacrylate/butadiene/styrene copolymer (MBS resin).

A non-rubber-modified styrene polymer is a polymer obtained by substantially the same method as described in connection with the rubber-modified styrene polymer except that a rubbery polymer is not used. That is, a non-rubber-modified styrene polymer can be obtained by polymerizing or copolymerizing an aromatic vinyl monomer such as styrene, α-methylstyrene, or p-methylstyrene and optionally an unsaturated nitrile monomer (such as acrylonitrile or methacrylonitrile) or other monomers such as acrylic acid, methacrylic acid, maleic anhydride, and N-substituted maleimides. Examples of non-rubber-modified styrene polymers include polystyrene (PS) and acrylonitrile/styrene copolymer (AS resin).

With respect to the styrene polymer used in the present invention, the reduced viscosity $\eta_{sp}/C$ (as measured in a 0.005 g/cm³ solution at 30° C.), which is a measure of the molecular weight, is preferably in the range of from 30 to 80 cm³/g, more preferably from 40 to 60 cm³/g, wherein, when the styrene polymer is a polystyrene resin, toluene is used as the solvent and when the styrene polymer is an unsaturated nitrile/aromatic vinyl copolymer, methyl ethyl ketone is used as the solvent. In the production of the styrene polymer, the reduced viscosity $\eta_{sp}/C$ can be controlled by selecting the type and amount of the initiator, the polymerization temperature and the amount of chain transfer agent.

In the present invention, a resin mixture of aromatic polycarbonate and styrene polymer is preferably used as resin component (a) when improvement in the melt fluidity of the aromatic polycarbonate is desired. The resin mixture used as resin component (a) preferably has an aromatic polycarbonate content of 20% by weight or more, more preferably from 50 to 95% by weight, that is, the styrene polymer of the resin mixture is 80% by weight or less, preferably from 5 to 50% by weight. When the aromatic polycarbonate content is less than 20% by weight, the heat resistance and mechanical strength of the ultimate shaped article become unsatisfactory. When the styrene polymer content is less than 5% by weight, the improvement in the moldability of the aromatic polycarbonate resin composition becomes unsatisfactory.

The organopolysiloxane used as component (b) in the present invention is a component which plays an important role in imparting flame retardancy to the aromatic polycarbonate resin composition, and comprises at least one linear organopolysiloxane (b)i and at least one cyclic organopolysiloxane (b)ii.

The above-mentioned linear organopolysiloxane (b)i is represented by the following formula:

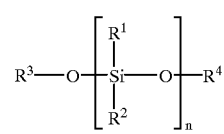

(5)

wherein:
n represents an integer of 2 or more;
each $R^1$ independently represents a monovalent $C_6$–$C_{20}$ hydrocarbon group containing an aromatic group;
each $R^2$ independently represents a monovalent $C_1$–$C_{20}$ hydrocarbon group containing no aromatic group; and
each of $R^3$ and $R^4$ independently represents a hydrogen atom or a triorganosilyl group $SiR^5{}_3$, wherein each $R^5$ independently represents a monovalent $C_1$–$C_{20}$ hydrocarbon group.

The above-mentioned cyclic organopolysiloxane (b)ii is represented by the following formula:

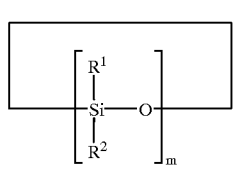

(6)

wherein m represents an integer of 3 or more; and
$R^1$ and $R^2$ are as defined for formula (1) above.
In the present invention, $R^1$ in formulae (5) and (6) above which represent a monovalent $C_6$–$C_{20}$ hydrocarbon group containing an aromatic group include alkyl groups substituted with aromatic hydrocarbon group(s), aromatic hydrocarbon group(s) substituted with alkyl group(s), and also a monovalent $C_6$–$C_{20}$ aromatic hydrocarbon group, per se. Examples of hydrocarbon groups $R^1$ include a phenyl group, a tolyl group, a xylyl group, a benzyl group, a 2-phenylethyl group, a 1-phenylethyl group, a 2-methyl-2-phenylethyl group, a naphthyl group and a biphenyl group. Of these, a phenyl group is especially preferred.

Examples of hydrocarbon groups $R^2$ in formulae (5) and (6) above include alkyl groups such as methyl, ethyl, propyl, isopropyl, butyl, pentyl, hexyl, and octyl groups; alkenyl groups such as a vinyl group; and cycloalkyl groups such as a cyclohexyl group. Of these, a methyl group is especially preferred.

In the present invention, it is preferred that each $R^1$ in formulae (5) and (6) above is a phenyl group and each $R^2$ in formulae (5) and (6) above is a methyl group. That is, the use of a linear phenylmethylsiloxane (homopolymer) as linear organopolysiloxane (b)i, and a cyclic phenylmethylsiloxane (homopolymer) as cyclic organopolysiloxane (b)ii is especially preferred.

As apparent from formulae (5) and (6) above, each of linear organopolysiloxane (b)i and cyclic organopolysiloxane (b)ii used in the present invention consists of D structures ($R_2SiO_{1/2}$). As described above, a branched organopolysiloxane mainly comprises branched structures such as T and Q structures, and is generally resinous. On the other hand, an organopolysiloxane consisting substantially of D structures is a linear or cyclic organopolysiloxane in an oil form, and such an organopolysiloxane has excellent fluidity as compared to that of the branched organopolysiloxane.

In addition, as compared to the branched organopolysiloxane molecule, the organopolysiloxane molecule consisting substantially of D structures has a high content of hydrocarbon groups (i.e., R in the formulae above), relative to the content of silicon atoms. Therefore, the organopolysiloxane consisting substantially of D structures exhibits an excellent dispersibility in aromatic polycarbonates and styrene polymers as compared to that of branched organopolysiloxanes.

Moreover, for the reasons mentioned below, the organopolysiloxane consisting substantially of D structures is free from the problems accompanying the use of branched organopolysiloxanes, specifically the problems caused by the presence of reactive terminal groups. Branched organopolysiloxanes containing high quantities of T and Q structures are produced by a hydrolytic polymerization of multifunctional silane compounds, such as trichlorosilane, tetrachlorosilane, trialkoxysilane and tetraalkoxysilane, and contain a large amount, i.e. several percent to several tens of percent by weight of reactive terminal groups, such as silanol groups or alkoxysilyl groups. Therefore, when the branched organopolysiloxane is incorporated into an aromatic polycarbonate at a high temperature, crosslinking of the organopolysiloxane per se as well as lowering of the molecular weight of the aromatic polycarbonate are likely to occur.

On the other hand, as described below, linear organopolysiloxane (b)i and cyclic organopolysiloxane (b)ii used in the present invention are produced by a hydrolytic polymerization of bifunctional silane compounds, such as dichlorosilane and dialkoxysilane. Molecules of linear organopolysiloxanes (b)i may still contain the above-mentioned reactive terminal groups. However, in the case of linear organopolysiloxanes, terminal groups are only present at the ends of the molecular chains i.e., two terminal groups per molecule, and thus the terminal group content per unit weight of a linear organopolysiloxane is extremely low. On the other hand, in the case of branched organopolysiloxanes, a large number of terminal groups is present in one molecule (i.e., three or more terminal groups per molecule) and, thus, the terminal group content per unit weight of a branched organopolysiloxane is high. For this reason, the incorporation of linear organopolysiloxane (b)i into an aromatic polycarbonate does not cause the above-mentioned problems occurring due to a large number of reactive terminal groups.

When linear organopolysiloxane (b)i contains a silanol group at a terminal thereof, if desired, the chemical stability of linear organopolysiloxane (b)i can be improved by blocking the terminal silanol groups, namely by introducing a triorganosilyl group $SiR^5_3$ wherein each $R^5$ independently represents a monovalent $C_1$–$C_{20}$ hydrocarbon group, onto the terminal silanol group of the linear organopolysiloxane molecule. With respect to the hydrocarbon group $R^5$ of the triorganosilyl group, a methyl group or a phenyl group is especially preferred.

Cyclic organopolysiloxane (b)ii contains no reactive terminal groups. Therefore, cyclic organopolysiloxanes (b)ii do not cause the above-mentioned problems caused by reactive terminal groups.

In general, for enhancing the compatibility of an organopolysiloxane with the aromatic polycarbonate and the styrene polymer, it is required to increase an aromatic group content of an organopolysiloxane molecule. By increasing the aromatic group content, the flame retardancy of the resultant resin composition can also be enhanced.

For increasing the aromatic group contents of linear and cyclic organopolysiloxanes, it is necessary to use recurring units containing an increased amount of aromatic groups, namely the above-mentioned D structure in which the substituent R is a hydrocarbon group containing an aromatic group. As examples of such recurring units, there can be mentioned recurring units respectively represented by the following formulae (8) and (9):

(8)

wherein $R^1$ and $R^2$ are as defined for formula (5) above, and

(9)

wherein $R^1$ is defined in formulae (5) and (6) above.

The aromatic group content of the recurring unit represented by formula (9) (hereinafter, referred to as "recurring unit (9)") is higher than that of the recurring unit represented by formula (8) (hereinafter, referred to as "recurring unit (8)"). Therefore, the use of recurring unit (9) is advantageous for increasing the aromatic group content of an organopolysiloxane.

However, the raw material for producing recurring unit (9) is expensive. In addition, since recurring unit (9) contains two $R^1$ groups which are sterically bulky substituents, the polymerization of recurring units (9) is difficult, so that it is difficult to produce, especially on a commercial scale, an organopolysiloxane comprising recurring units (9) only.

In addition, when an organopolysiloxane contains recurring units (9) in a large amount, the compatibility of the organopolysiloxane with a resin becomes too high. With respect to a shaped article obtained by molding an aromatic polycarbonate resin composition containing such an organopolysiloxane having too high a content of recurring units (9), when the shaped article burns, the plasticization and liquidization of the resin composition are likely to occur, leading to dripping of flaming particles. For this reason, an organopolysiloxane comprising recurring units (8) is preferably used in the present invention.

When an organopolysiloxane exhibits low compatibility with an aromatic polycarbonate and a styrene polymer, a problem is likely to occur in that the organopolysiloxane is not uniformly and finely dispersed in the final shaped article, so that the article suffers non-uniformity in coloring when colored, as well as the potential of bleeding of the organopolysiloxane to the surface of the article.

The present invention is based on the novel finding that, when linear organopolysiloxane (b)i and cyclic organopolysiloxane (b)ii are used in combination, not only can the compatibility of the organopolysiloxane with an aromatic polycarbonate and a styrene polymer be improved, but also the dripping of flaming particles can be prevented, and as a result, a high level of flame retardancy is imparted to an aromatic polycarbonate.

In the present invention, it is required to use a linear organopolysiloxane comprising recurring units (8) (i.e., linear organopolysiloxane (b)i represented by formula (5) above) and a cyclic organopolysiloxane comprising recurring units (8) (i.e., cyclic organopolysiloxane (b)ii represented by formula (6) above).

The process for the production of the organopolysiloxane comprising recurring units (8) can be conducted with ease, as compared to the production of an organopolysiloxane comprising recurring units (9). Therefore, the organopolysiloxane containing recurring units (8) is also advantageous from the viewpoint of a commercial production thereof.

The amount of cyclic organopolysiloxane (b)ii in organopolysiloxane (b) is from 5 to 95% by weight, preferably from 10 to 80% by weight, more preferably from 10 to 60% by weight, based on the total weight of linear organopolysiloxane (b)i and cyclic organopolysiloxane (b)ii. When the amount of cyclic organopolysiloxane (b)ii is less than 5% by weight, the compatibility of organopolysiloxane (b) with the aromatic polycarbonate and the styrene polymer may become unsatisfactory. On the other hand, when the amount of cyclic organopolysiloxane (b)ii is more than 95% by weight, the dripping of flaming particles is more likely to occur when the molded article burns.

There is no particular limitation with respect to the upper limit of the number of recurring units in cyclic organopolysiloxane (b)ii, but "m" in formula (6) is preferably 3 to 6. Cyclic organopolysiloxane (b)ii of formula (6) in which m is from 3 to 6 recurring units is especially preferred from the viewpoint of ease in production thereof and the effect on improving the compatibility of organopolysiloxane (b) with the aromatic polycarbonate and the styrene polymer.

There is no particular limitation with respect to the molecular weight of linear organopolysiloxane (b)i, but the molecular weight of (b)i is preferably in a range such that the kinematic viscosity of organopolysiloxane (b), comprising organopolysiloxanes (b)i and (b)ii), is in the range of from 10 to 1,000,000 mm$^2$/sec, as measured at 25° C. in accordance with JIS-K2410. Such a kinematic viscosity is preferred from the viewpoint of volatility, kneadability and ease in handling with respect to organopolysiloxane (b).

The amount of organopolysiloxane (b) used in the aromatic polycarbonate resin composition is from 0.1 to 50 parts by weight, preferably from 0.5 to 20 parts by weight, relative to 100 parts by weight of a resin component (a). When the amount of organopolysiloxane (b) is less than 0.1 part by weight, the flame retardancy of the aromatic polycarbonate resin composition imparted by organopolysiloxane (b) is generally unsatisfactory. On the other hand, when the amount of organopolysiloxane (b) is more than 50 parts by weight, the mechanical properties such as impact resistance of the aromatic polycarbonate resin composition become disadvantageously low.

There is no particular limitation with respect to the method for producing organopolysiloxane (b), and any conventional methods can be employed. A conventional method for producing an organopolysiloxane is a method in which an aromatic group-containing dichlorosilane $R^1R^2SiCl_2$ or an aromatic group-containing dialkoxysilane $R^1R^2Si(OR)_2$ (wherein R represents an alkyl group) is subjected to hydrolytic polymerization. By this method there is generally obtained a mixture of linear organopolysiloxanes (b)i having terminal silanol groups and cyclic organopolysiloxanes (b)ii.

Linear organopolysiloxanes (b)i and cyclic organopolysiloxanes (b)ii can be separated from each other and purified. Linear organopolysiloxane (b)i alone can be subjected to polymerization in the presence of an acid catalyst or to equilibration polymerization, to thereby obtain linear organopolysiloxanes (b)i having a higher molecular weight.

The terminal silanol groups of linear organopolysiloxane (b)i may be left as they are, but the terminal silanol groups can be blocked with $R^5_3Si$ group by using an appropriate reagent, such as $R^5_3SiCl$ or $(R^5_3Si)_2O$ (wherein each $R^5$ independently represents a monovalent $C_1$–$C_{20}$ hydrocarbon group) during the above-mentioned hydrolytic polymerization, equilibration polymerization or the like. By blocking the terminal groups, the chemical stability of linear organopolysiloxane (b)i can be improved.

The cyclic organopolysiloxane produced by the hydrolytic polymerization can be used as cyclic organopolysiloxane (b)ii after being separated and purified from the mixture of linear and cyclic organopolysiloxanes. Alternatively, the obtained cyclic organopolysiloxane (b)ii can be subjected to ring-opening polymerization, to thereby convert cyclic organopolysiloxane (b)ii to linear organopolysiloxane (b)i. The terminal groups of the resultant linear organopolysiloxane (b)i can be controlled by using an appropriate type of catalyst and optionally a terminator such as $(R^5_3Si)_2O$ mentioned above.

A mixture of linear organopolysiloxane (b)i and cyclic organopolysiloxane (b)ii used as organopolysiloxane (b) can be obtained by mixing a separately produced linear organopolysiloxane (b)i and cyclic organopolysiloxane (b)ii. Alternatively, the mixture of linear organopolysiloxane (b)i and cyclic organopolysiloxane (b)ii produced by the above-mentioned hydrolytic polymerization, as such, may be used. When linear organopolysiloxane (b)i and cyclic organopolysiloxane (b)ii are produced separately and mixed together, the recurring units of linear organopolysiloxane (b)i and cyclic organopolysiloxane (b)ii may be the same or different.

Each of linear organopolysiloxane (b)i and cyclic organopolysiloxane (b)ii may be either a homopolymer or a copolymer. When an organopolysiloxane is a copolymer, the copolymer may be a random copolymer, a block copolymer or an alternating copolymer. Such an organopolysiloxane copolymer can be obtained by using two or more types of monomers having different $R^1$ and/or $R^2$, for example, two or more types of aromatic group-containing dichlorosilanes $R^1R^2SiCl_2$ having different $R^1$ and/or $R^2$ and/or two or more types of aromatic group-containing dialkoxysilanes $R^1R^2Si(OR)_2$ having different $R^1$ and/or $R^2$, wherein R represents an alkyl group.

The resin composition of the present invention may further comprise a flame retardant other than organopolysiloxane (b) to impart a high level of flame retardancy to the aromatic polycarbonate resin composition. For example, use can optionally be made of at least one flame retardant selected from the group consisting of (a) phosphate compounds; (b) inorganic phosphorus compounds, such as red phosphorus and ammonium polyphosphate; (c) metal salts of organic sulfonic acids; (d) metal salts of organic sulfonamides or organic sulfonimides; (e) halogen-containing organic compounds; (f) nitrogen-containing organic compounds, such as melamine, melamine cyanurate, melam, melem and mellon; and (g) inorganic metal compounds, such as magnesium hydroxide, calcium hydroxide, aluminum hydroxide, hydrotalcite, magnesium carbonate, calcium carbonate, zinc borate, antimony oxide, titanium oxide, zirconium oxide and zinc oxide. Among these flame retardants, phosphate compounds (a), metal salts of organic sulfonic acids (c) and metal salts of organic sulfonamides or organic sulfonimides (d) are preferred in view of the low toxicity thereof and less lowering of the physical properties of the final resin composition obtained by addition thereof.

Examples of phosphate compounds (a) include phosphates such as trimethyl phosphate, triethyl phosphate, tripropyl phosphate, tributyl phosphate, tripentyl phosphate, trihexyl phosphate, triphenyl phosphate, tritolyl phosphate, trixylyl phosphate, dimethyl ethyl phosphate, methyl dibutyl phosphate, ethyl dipropyl phosphate, hydroxyphenyl diphenyl phosphate; compounds obtained by introducing various substituents into the above-mentioned phosphates; and condensed phosphate compounds represented by the following formula (10):

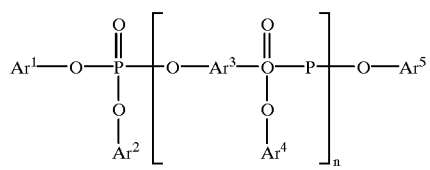

(10)

wherein:
n represents an integer of 1 to 10;
each of $Ar^1$, $Ar^2$, $Ar^4$ and $Ar^5$ independently represents an aromatic group selected from the group consisting of a non-substituted phenyl group and a phenyl group substituted with at least one $C_1$–$C_{10}$ hydrocarbon; and
$Ar^3$ represents a divalent $C_6$–$C_{20}$ aromatic hydrocarbon.

Examples of condensed phosphate compounds include bisphenol A tetraphenyldiphosphate, bisphenol A tetratolyldiphosphate, bisphenol A tetraxylylphosphate, bisphenol A di(phenylxylyl phosphate) and resorcinol tetraphenyldiphosphate.

Examples of metal salts of organic sulfonic acids (c) include potassium salts and sodium salts of organic sulfonic acids, such as trifluoromethanesulfonic acid, perfluoroethanesulfonic acid, perfluoropropanesulfonic acid, perfluorobutanesulfonic acid, perfluorohexanesulfonic acid, perfluorooctanesulfonic acid, trichlorobenzenesulfonic acid, diphenylsulfone-3-sulfonic acid, diphenylsulfone-3,3'-disulfonic acid and diphenylsulfone-3,4'-disulfonic acid. Of these, especially preferred are potassium perfluorobutanesulfonate, potassium trichlorobenzenesulfonate and potassium diphenylsulfone-3-sulfonate.

Examples of metal salts of organic sulfonamides or organic sulfonimides (d) include a potassium salt of N-(p-tolyl-sulfonyl)-p-toluenesulfonimide and a potassium salt of N-(N'-benzylaminocarbonyl)sulfanilimide.

Metal salts of organic sulfonic acids, or metal salts of organic sulfonamides or organic sulfonimides are used in an amount of from 0.001 to 5 parts by weight, relative to 100 parts by weight of resin component (a). When the amount of such a metal salt is less than the above-mentioned range, the effect of the metal salt to impart flame retardancy to the aromatic polycarbonate is low. When the amount of such a metal salt is more than the above-mentioned range, the heat stability of the aromatic polycarbonate may decrease.

In the present invention, a fluoroolefin resin can be used to reduce the amount of flaming particles dripping from a molded article when the article is on fire. As the fluoroolefin resins usable in the present invention, there can be mentioned homopolymers and copolymers comprising fluoroethylene structures. Examples of fluoroolefin resins include a difluoroethylene polymer, a trifluoroethylene polymer, a tetrafluoroethylene polymer, a tetrafluoroethylene-hexafluoropropylene copolymer, and a copolymer of tetrafluoroethylene and an ethylene monomer containing no fluorine. Of these, polytetrafluoroethylene (PTFE) is preferred. There is no particular limitation with respect to the molecular weight and configuration of the fluoroolefin resin. However, when a fluoroolefin resin is incorporated into the resin composition, it is preferred that the fluoroolefin resin is dispersed in the resin composition in the form of fibrils having a diameter of 0.5 μm or less. The amount of fluoroolefin resin incorporated into the resin composition is in the range of from 0.1 to 0.5 parts by weight, relative to 100 parts by weight of resin component (a). When the amount of fluoroolefin resin is less than the above-mentioned range, the effect of preventing the dripping of flaming particles is low, while when the amount of fluoroolefin resin is more than the above-mentioned range, both the fluidity and flame retardancy of the resin composition may suffer.

In the present invention, an auxiliary organic silicon compound other than organopolysiloxane (b) can be additionally used to enhance the flame retardancy of the resin composition of the present invention as long as the organic silicon compound exhibits no adverse effect on the properties of the resultant resin composition. Such an auxiliary organic silicon compound include polymers having a linear, branched, cyclic or three-dimensional network structure obtained by combining a plurality of at least one type of unit selected from the group consisting of M ($R^6_3SiO_{1/2}$), D ($R^6_2SiO_{2/2}$), T ($R^6SiO_{3/2}$) and Q ($SiO_{4/2}$) structures. In general, $R^6$ in the formulae above is a hydrogen atom; an alkyl group such as a methyl, ethyl, or propyl group; an alkenyl group such as a vinyl group; an aryl group such as a phenyl group; or an alkoxy group such as a methoxy or ethoxy group. If desired, a functional group other than these groups, such as a hydroxyl group, can be used in combination with these groups. In this connection, it should be noted that an organic silicon compound comprising the above-mentioned recurring units (8) is excluded from the organic silicon compounds usable herein. Among the organic silicon compounds, a silicone resin comprising T structures, an MQ resin comprising M and Q structures, and an MTQ resin comprising M, T and Q structures are preferably used.

If desired, the flame retardant resin composition of the present invention may optionally contain various additives generally used with thermoplastic resins to improve moldability, impact resistance, stiffness, weatherability, appearance and the like. Examples of additives include heat stabilizers; antioxidants; ultraviolet light absorbers; weathering agents; antimicrobial agents; compatibility agents; colorants (dyes and pigments); mold release agents; lubricants; antistatic agents; plasticizers; polymers, such as other resins and rubbers; and fillers. There is no particular limitation with respect to the amount of additives used as long as the additives exhibit no adverse effect on the properties of the flame retardant resin composition of the present invention.

With respect to the method for producing the flame retardant aromatic polycarbonate resin composition of the present invention, there is no particular limitation, and conventional methods can be employed. For example, there can be mentioned:

- a method in which a resin component (a) and an organopolysiloxane (b) are preliminarily mixed in a mixer, such as a Henschel mixer, a super mixer, a tumble mixer and a ribbon blender, and the resultant mixture is melt-kneaded by means of an extruder, such as a single-screw extruder, a twin-screw extruder or a Banbury mixer;
- a method in which a resin component (a) is melted in a static mixer, a single-screw extruder, a twin-screw extruder or the like, and an organopolysiloxane (b) is added to and mixed with the melted resin component (a), whereupon the resultant mixture is melt-kneaded; and
- a method in which a masterbatch is produced by melt-kneading a part of resin component (a), and a whole amount of organopolysiloxane (b) and optionally any other substances, such as a flame retardant other than organopolysiloxane (b), and then the masterbatch is added to the remainder of resin component (a), followed by melt-kneading. These methods are illustrative and not limiting.

The flame retardant resin composition of the present invention can be advantageously used for producing housings and parts of office automation machines, data communication equipments, electric and electronic appliances and household electric appliances, such as copiers, facsimile machines, television sets, radios, tape recorders, video decks, personal computers, printers, telephones, data terminal equipment, portable telephones, refrigerators, microwave ovens, and the like. The flame retardant resin composition of the present invention can also be advantageously used for producing parts for automobiles.

The present invention will be further described in more detail with reference to the following Examples and Comparative Examples, which should not be construed as limiting the scope of the present invention.

In the following Examples and Comparative Examples, the following components were used.

(A) Aromatic Polycarbonate PC: A commercially available bisphenol A type polycarbonate having a viscosity average molecular weight of 20,000 (trade name: lupilon S3000, manufactured and sold by Mitsubishi Engineering-Plastics Corporation, Japan);

(B) Styrene Polymer HIPS: A commercially available high impact polystyrene (trade name: Styron, manufactured and sold by Asahi Kasei Corporation, Japan);

ABS: A commercially available ABS resin (trade name: Stylac ABS, manufactured and sold by Asahi Kasei Corporation, Japan);

(C) Organopolysiloxane:

(I): A linear phenylmethylsiloxane homopolymer, which was produced by hydrolytic polymerization of phenylmethyldichlorosilane without blocking the terminal silanol groups. This homopolymer contained approximately 15% by weight of a cyclic tetramer (i.e., tetramethyltetraphenylcyclotetrasiloxane), confirmed by gel permeation chromatography "GPC" and exhibited a kinematic viscosity at 25° C. of approximately 800 mm$^2$/sec;

(II): A linear phenylmethylsiloxane homopolymer, which was produced by hydrolytic polymerization of phenylmethyldichlorosilane without blocking the terminal silanol groups. This homopolymer contained a cyclic tetramer (i.e., tetramethyltetraphenylcyclotetrasiloxane) and a cyclic trimer (i.e., trimethyltriphenylcyclotrisiloxane), wherein the total content of the cyclic tetramer and cyclic trimer was about 26 by weight (confirmed by GPC), and exhibited a kinematic viscosity at 25° C. of approximately 600 mm$^2$/sec;

(III): A commercially available linear phenylmethylsiloxane homopolymer (trade name: PMM0021, manufactured and sold by Gelest, Inc., U.S.A.), wherein the terminal groups of the homopolymer were blocked with a trimethylsilyl group, confirmed by nuclear magnetic resonance spectroscopy "NMR". This homopolymer contained approximately 3% by weight of a cyclic tetramer (i.e., tetramethyltetraphenylcyclotetrasiloxane) (confirmed by GPC) and exhibited a kinematic viscosity at 25° C. of approximately 100 mm$^2$/sec;

(IV): A commercially available linear phenylmethylsiloxane homopolymer (trade name: PMM0025, manufactured and sold by Gelest, Inc., U.S.A.), wherein the terminal groups of the homopolymer were blocked with a trimethylsilyl group (confirmed by NMR). This homopolymer contained approximately 2% by weight of a cyclic tetramer (i.e., tetramethyltetraphenylcyclotetrasiloxane) (confirmed by GPC) and exhibited a kinematic viscosity at 25° C. of approximately 500 mm$^2$/sec;

(V): A commercially available cyclic tetramer of phenylmethylsiloxane (i.e., tetramethyltetraphenylcyclotetrasiloxane) (trade name: LS8970, manufactured and sold by Shin-Etsu Chemical Co., Ltd., Japan);

(VI): A commercially available linear copolymer of dimethylsiloxane with diphenylsiloxane (phenyl group/methyl group ratio=25/75) (trade name: KF54, manufactured and sold by Shin-Etsu Chemical Co., Ltd., Japan). This copolymer exhibited a kinematic viscosity at 25° C. of approximately 400 mm$^2$/sec;

(VII): A commercially available linear copolymer of diphenylsiloxane and phenylmethylsiloxane (phenyl group/methyl group ratio=75/25) (trade name: PMP5053, manufactured and sold by Gelest, Inc., U.S.A.). This copolymer exhibited a kinematic viscosity at 25° C. of from 200,000 to 500,000 mm$^2$/sec;

(VIII): An organopolysiloxane having a weight average molecular weight of about 20,000 measured by GPC using a calibration curve obtained with respect to standard polystyrene systems, phenyl group/methyl group ratio=60/40, D structure/T structure ratio=20/80). This organopolysiloxane was produced by reacting phenyltrichlorosilane, methyltrichlorosilane and phenylmethyldichlorosilane with an excess amount of water, thereby conducting a hydrolytic condensation of these silane compounds.

(IX): A commercially available liquid phenylmethylpolysiloxane comprising D structures and T structures (trade name: X-40-9235, manufactured and sold by Shin-Etsu Chemical Co., Ltd., Japan). This liquid phenylmethylpolysiloxane exhibited a kinematic viscosity at 25° C. of approximately 2,200 mm$^2$/sec.

As flame retardants other than the above-mentioned organopolysiloxanes, potassium perfluorobutanesulfonate (trade name: F114, manufactured and sold by DAINIPPON INK & CHEMICALS, INC., Japan) and polytetrafluoroethylene (trade name: Teflon 30J, manufactured and sold by Dupont-Mitsui Fluorochemical Co., Ltd., Japan), were used.

EXAMPLES 1 AND 6 TO 9, AND COMPARATIVE EXAMPLE 9

In accordance with the formulations indicated in Tables 1 and 2, the components were preliminarily mixed with each other. Using a KZW15-45MG type extruder (manufactured and sold by Technovel Corporation, Japan), each of the resultant mixtures was individually melt-kneaded at 260° C., thereby obtaining a resin composition (in the form of pellet). Each of the obtained resin compositions was individually subjected to injection molding at a temperature of 260° C. by means of MJEC10 type injection molding machine (manufactured and sold by Modern Machinery Company, Japan), thereby obtaining test samples each having a thickness of 3.18 mm.

The appearance of the test samples, especially with respect to the bleeding of organopolysiloxane, was visually examined. Further, using the same test samples, the self-extinguishing properties of the resin compositions were evaluated in accordance with the Vertical Burning Method which is described in UL-94.

The results are shown in Tables 1 and 2.

EXAMPLES 2 TO 5 AND COMPARATIVE EXAMPLES 1 TO 8

In accordance with the formulations indicated in Tables 1 and 2, the components were preliminarily mixed with each other. Using a Laboplastomill (manufactured and sold by Toyo Seiki Co., Ltd., Japan), each of the resultant mixtures was individually melt-kneaded for 10 minutes under conditions wherein the temperature was 220° C. and the revolution rate was 60 rpm, thereby obtaining a resin composition. Each of the obtained resin compositions was individually subjected to compression molding, thereby obtaining test samples each having a thickness of 3.18 mm.

The appearance of the test samples, especially with respect to the bleeding of organopolysiloxane, was visually examined. Further, using the same test samples, the self-extinguishing properties of the resin compositions were evaluated in accordance with the Vertical Burning Method which is described in UL-94. The results are also shown in Tables 1 and 2.

TABLE 1

| | | | EX. 1 | EX. 2 | EX. 3 | EX. 4 | EX. 5 | EX. 6 | EX. 7 | EX. 8 | EX. 9 |
|---|---|---|---|---|---|---|---|---|---|---|---|
| COMPOSITION (Parts by Weight) | (a) | PC | 100 | 100 | 100 | 100 | 100 | 89 | 89 | 78 | 78 |
| | | HIPS | — | — | — | — | — | 11 | — | — | — |
| | | ABS | — | — | — | — | — | — | 11 | 22 | 22 |
| | (b)i | Linear Organo-poly-siloxane | (I) 11.1 | (II) 11.1 | (III) 10.1 | (IV) 2.6 | (IV) 2.8 | (II) 11.1 | (II) 11.1 | (II) 11.1 | (IV) 5.6 |
| | (b)ii | Cyclic Organo-poly-siloxane | | | (V) 1.1 | (V) 2.6 | (V) 8.3 | | | | (IV) 5.6 |
| | Other flame retardants | F114 | — | — | — | — | 0.1 | 0.5 | 0.5 | 0.5 | 0.5 |
| | | PTFE | — | — | — | — | — | — | — | 0.3 | 0.3 |
| | Appearance | | ○ | ○ | ○ | ○ | ○ | ○ | ○ | ○ | ○ |
| EVALUATION | Evaluation according to UL-94 | Average flame-out time (sec) | 3.5 | 4.1 | 4.5 | 6.6 | 3.9 | 4.8 | 4.6 | 4.7 | 4.2 |
| | | Dripping of flaming particles | Not Observed | Not Observed | Not Observed | Not Observed | Not Observed | Not Observed | Not Observed | Not Observed | Not Observed |
| | | Evaluation | V-0 | V-0 | V-0 | V-1 | V-0 | V-0 | V-0 | V-0 | V-0 |

Appearance ○: Neither non-uniformity of the surface of the test sample nor bleeding of organopolysiloxane to the surface of the test sample was observed.

TABLE 2

|  |  |  | COMP. EX. 1 | COMP. EX. 2 | COMP. EX. 3 | COMP. EX. 4 | COMP. EX. 5 | COMP. EX. 6 | COMP. EX. 7 | COMP. EX. 8 | COMP. EX. 9 |
|---|---|---|---|---|---|---|---|---|---|---|---|
| COMPOSITION (Parts by Weight) | (a) | PC | 100 | 100 | 100 | 100 | 100 | 100 | 100 | 100 | 100 |
|  |  | HIPS | — | — | — | — | — | — | — | — | — |
|  |  | ABS | — | — | — | — | — | — | — | — | — |
|  | (b)i | Linear Organo-poly-siloxane | (III) 11.1 | (IV) 11.1 | — | (VI) 11.1 | (VII) 11.1 | (VII) 5.3 | (VIII) 11.1 | (IX) 11.1 | — |
|  | (b)ii | Cyclic Organo-poly-siloxane | — | — | (V) 5.3 | — | — | — | — | — | — |
|  | Other flame retardants | F114 | — | — | — | — | — | — | — | — | — |
|  |  | PTFE | — | — | — | — | — | — | — | — | — |
|  | Appearance |  | X | X | ○ | X | ○ | ○ | XX | ○ | ○ |
| EVALUATION | Evaluation according to UL-94 | Average flame-out time (sec) | 4.0 | 5.4 | 10.7 | 6.1 | 5.2 | 7.8 | 8.9 | 4.9 | 17.2 |
|  |  | Dripping of flaming particles | Not Observed | Not Observed | Observed | Not Observed | Observed | Observed | Observed | Observed | Observed |
|  |  | Evaluation | V-0 | V-1 | V-1 | V-1 | V-1 | V-1 | V-1 | V-1 | Below the standards |

Appearance ○: Neither non-uniformity of the surface of the test sample nor bleeding of organopolysiloxane to the surface of the test sample was observed.
Appearance X: Bleeding of organopolysiloxane to the surface of the test sample was observed.
Appearance XX: Foaming was observed on the surface of the test sample, and the test sample was brittle.

The test sample produced in each of Examples 1 to 9 (in which a linear phenylmethylpolysiloxane was used in combination with a cyclic trimer or tetramer of phenylmethylpolysiloxane) had excellent appearance and excellent self-extinguishing properties. Further, when each of these test samples was evaluated in accordance with UL-94, no occurrence of dripping of flaming particles was observed.

On the other hand, although the test sample produced in each of Comparative Examples 1 and 2 in which a phenylmethylpolysiloxane containing almost no cyclic oligomer was used had excellent self-extinguishing properties, bleeding of the organopolysiloxane to the surface of each of these test samples was observed and, thus, the appearance of each of these test samples was unsatisfactory.

The test sample produced in Comparative Example 3 in which only a cyclic tetramer was used had excellent appearance. However, when this test sample was evaluated in accordance with UL-94, dripping of flaming particles was observed.

In Comparative Example 4 in which a linear phenylmethylpolysiloxane copolymer was used, wherein the content of phenyl groups of the copolymer was low, the compatibility of the copolymer with the aromatic polycarbonate resin was poor. As a result, with respect to the test sample produced in Comparative Example 4, bleeding of the organopolysiloxane to the surface of the test sample was observed.

In each of Comparative Example 5 and 6 in which a linear copolymer of diphenylsiloxane with phenylmethylsiloxane was used, the compatibility of the copolymer with the aromatic polycarbonate resin was good. However, when each of the test samples was evaluated in accordance with UL-94, dripping of flaming particles was observed.

The test sample produced in each of Comparative Examples 7 and 8 in which a silicone resin having a branched structure comprising D structures and T structures was used was tested in accordance with UL-94. In the test, dripping of flaming particles was observed. With respect to the test sample produced in Comparative Example 7, foaming was observed on the surface of the test sample during the injection molding, and thus the test sample was brittle.

As apparent from the above, the resin composition of the present invention in which a linear phenylmethylpolysiloxane was used in combination with a cyclic trimer or tetramer of phenylmethylpolysiloxane exhibits very excellent properties. As the resin composition of the present invention contains no halogen, exhibits excellent flame retardancy and moldability, and also exhibits excellent stability and appearance with respect to a molded article produced from the resin composition, the resin composition of the present invention can be satisfactorily used as a material for parts of increasing size and decreasing section such as parts for office automation machines, data communication equipment, electric and electronic appliances, household electric appliances, and automobiles.

What is claimed is:

1. A flame retardant aromatic polycarbonate resin composition comprising:
    100 parts by weight of a resin component (a) comprising an aromatic polycarbonate and optionally a styrene polymer, wherein said resin component has an aromatic polycarbonate content of 20% by weight or more relative to the weight of (a); and
    0.1 to 50 parts by weight of an organopolysiloxane (b) comprising at least one linear organopolysiloxane (b)i and at least one cyclic organopolysiloxane (b)ii, wherein said organopolysiloxane (b) contains component (b)ii in an amount of from 5 to 95% by weight, based on the total weight of components (b)i and (b)ii, said at least one linear organopolysiloxane (b)i having the following formula (1):

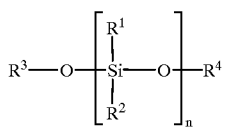
(1)

wherein:

n represents an integer of 2 or more;

each $R^1$ independently represents a monovalent $C_6$–$C_{20}$ hydrocarbon group containing an aromatic group;

each $R^2$ independently represents a monovalent $C_1$–$C_{20}$ hydrocarbon group containing no aromatic group; and each of $R^3$ and $R^4$ independently represents a hydrogen atom or a triorganosilyl group $SiR^5{}_3$, wherein each $R^5$ independently represents a monovalent $C_1$–$C_{20}$ hydrocarbon group; and said at least one cyclic organopolysiloxane (b)ii having the formula (2):

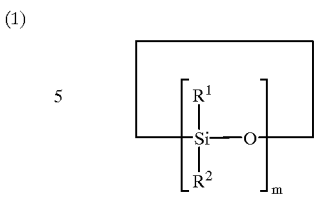
(2)

wherein m represents an integer of 3 or more; and
$R^1$ and $R^2$ are as defined for formula (1) above.

2. The composition of claim 1, wherein each $R^1$ in said formulae (1) and (2) is a phenyl group and each $R^2$ in said formulae (1) and (2) is a methyl group.

3. The composition of claim 1, wherein said cyclic organopolysiloxane (b)ii constitutes from 10 to 80 percent by weight of organopolysiloxane (b) relative to the total weight of (b)i and (b)ii.

4. The composition of claim 1, wherein said cyclic organopolysiloxane (b)ii constitutes from 10 to 60 percent by weight of organopolysiloxane (b) relative to the total weight of (b)i and (b)ii.

5. The composition of claim 1, wherein m in said cyclic organopolysiloxane is an integer from 3 to 6.

* * * * *